(12) United States Patent
Geiser

(10) Patent No.: US 7,802,772 B2
(45) Date of Patent: Sep. 28, 2010

(54) PENDULUM AND SLIDE GATE VACUUM VALVE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 759 days.

(21) Appl. No.: 11/641,114

(22) Filed: Dec. 19, 2006

(65) Prior Publication Data

US 2007/0138426 A1 Jun. 21, 2007

Related U.S. Application Data

(63) Continuation-in-part of application No. 11/588,354, filed on Oct. 27, 2006, which is a continuation-in-part of application No. 11/311,434, filed on Dec. 20, 2005, now Pat. No. 7,396,001.

(30) Foreign Application Priority Data

Oct. 25, 2006 (IN) .................... 2326/DEL/2006

(51) Int. Cl.
*F16K 1/16* (2006.01)
(52) U.S. Cl. ............... 251/301; 251/193; 251/175
(58) Field of Classification Search ........ 251/158, 251/175, 193, 195, 200, 300, 301, 197; 137/630, 137/630.12–630.15
See application file for complete search history.

(56) References Cited

U.S. PATENT DOCUMENTS 1,323,264 A * 12/1919 Wilson .................. 123/553

(Continued)

FOREIGN PATENT DOCUMENTS

DE 1 264 191 B1 3/1968

(Continued)

*Primary Examiner*—John K Fristoe, Jr.
*Assistant Examiner*—Marina TietJen
(74) *Attorney, Agent, or Firm*—Rothwell, Figg, Ernst & Manbeck, P.C.

(57) ABSTRACT

The invention relates to a valve, in particular a pendulum or slide gate valve, for essentially gastight closing of a flow path (F). The valve includes a valve housing (1) having a first wall (2) which has a first opening (3) and a first valve seat (4), a valve plate (5) having a closing side (6) with a first sealing ring (7) and at least one drive (8). By action of the drive (8), the valve plate (5) is pivotable or displaceable from an opened position (A) essentially parallel to the first valve seat (4), and the perpendicular distance between the valve plate (5), and the first valve seat (4) can be reduced so that, in the closed position (C), the flow path (F) is closed essentially gastight by an axially sealing contact between the first sealing ring (7) and the first valve seat (4). The valve plate (5) includes support part (9), which is connected to the drive (8) and fixes the first sealing ring (7) in the perpendicular direction to the first valve seat (4), and a sealing part (10) which has an inner circumferential area (11) and which is mounted so as to be movable relative to the support part (9) in a direction (Z) essentially perpendicular to the first valve seat (4). The inner circumferential area (11) encloses the first sealing ring (7) in an essentially gastight way with an inner seal. Thus, in the closed position (C), a pressure difference at the valve plate (5) acts essentially on the sealing part (10) so that sealing part (10), decoupled from the support part (9), is supported perpendicularly on a section of the valve housing (1), in particular the first valve seat (4) or a lateral groove (27).

18 Claims, 7 Drawing Sheets

U.S. PATENT DOCUMENTS

| | | |
|---|---|---|
| 3,145,969 A | 8/1964 | von Zweck |
| 4,408,634 A * | 10/1983 | Peacock ................ 137/630.12 |
| 5,577,707 A | 11/1996 | Brida |
| 6,089,537 A | 7/2000 | Olmsted |
| 6,416,037 B1 | 7/2002 | Geiser |
| 6,431,518 B1 * | 8/2002 | Geiser ......................... 251/62 |
| 6,561,483 B2 | 5/2003 | Nakagawa |
| 6,561,484 B2 | 5/2003 | Nakagawa et al. |
| 6,629,682 B2 * | 10/2003 | Duelli ......................... 251/158 |
| 7,396,001 B2 * | 7/2008 | Geiser ......................... 251/301 |
| 2005/0067603 A1 | 3/2005 | Lucas et al. |

FOREIGN PATENT DOCUMENTS

| | | |
|---|---|---|
| DE | 77 31 993 U | 1/1978 |
| DE | 34 47 008 C2 | 7/1985 |

\* cited by examiner

PENDULUM AND SLIDE GATE VACUUM VALVE

CROSS-REFERENCE TO RELATED APPLICATIONS

This application is a continuation-in-part of U.S. application Ser. No. 11/588,354, filed Oct. 27, 2006, which is a continuation-in-part of U.S. application Ser. No. 11/311,434, filed Dec. 20, 2005.

TECHNICAL FIELD OF THE INVENTION

The invention relates to a vacuum valve for essentially gastight closing of a flow path by swivelling or moving a valve plate over an opening and pressing the valve plate onto a valve seat surrounding the opening. Such valves are used in particular in vacuum technology and are referred to in particular as pendulum valves or slide gate valves.

DESCRIPTION OF THE PRIOR ART

Valves of the type mentioned at the outset are known in different embodiments from the prior art and are used in particular in the area of IC and semiconductor manufacture, which must take place in a protected atmosphere, as far as possible without the presence of contaminating particles. Pendulum valves serve, for example, for controlling the gas flow between a process chamber and a vacuum pump. Slide gate valves are arranged, for example, in connecting passages between manufacturing chambers of a manufacturing plant for semiconductor wafers or liquid crystal substrates, it being possible to open the connecting passages by means of the slide gate valves for the transfer of highly sensitive semiconductor or liquid crystal elements from one manufacturing chamber to the next and to be closed gastight after the respective manufacturing step has been carried out.

In the case of a pendulum valve, in a first step, a generally round valve plate or valve disk is swivelled rotationally over a generally likewise round opening from a position in which the opening is unobstructed to an intermediate position covering the opening. In the case of a slide gate valve, the valve plate or valve disk, like the opening, is generally rectangular and is moved in this first step linearly from a position in which the opening is not obstructed to an intermediate position covering the opening. In this intermediate position, the valve plate of the pendulum or slide gate valve is in a position opposite to and a distance away from the valve seat surrounding the opening. In a second step, the distance between the valve plate and the valve seat is reduced so that the valve plate and the valve seat are pressed uniformly one onto the other and the opening is closed essentially gastight. This second movement is effected essentially in a direction perpendicular to the valve seat. As a result of the closing process taking place in two steps, the sealing ring between the valve plate and the valve seat is subjected to scarcely any shear forces which would destroy the sealing ring, since the movement of the valve plate in the second step takes place essentially linearly and perpendicularly to the valve seat.

The prior art discloses different drive systems for achieving this combination of a rotational movement of the valve plate in the case of the pendulum valve and a translational movement of the valve plate in the case of the slide gate valve, parallel over the opening, and an essentially translational movement perpendicular to the opening, for example from U.S. Pat. No. 6,089,537 (Olmsted) for a pendulum valve and from U.S. Pat. No. 6,416,037 (Geiser) for a slide gate valve.

The pressing of the valve plate onto the valve seat must be effected in a manner such that both the required gas tightness within the entire pressure region is ensured and damage to the sealing medium, in particular the sealing ring in the form of an O-ring, by application of excessively high pressure is avoided. In order to ensure this, known valves provide controlled contact pressure regulation of the valve plate as a function of the pressure difference prevailing between the two valve plate sides. Particularly in the case of large pressure variations or change from reduced pressure (relative negative pressure) to excess pressure (relative positive pressure), or vice versa, a uniform force distribution along the entire circumference of the sealing ring cannot, however, always be ensured. In general, attempts are made to decouple the sealing ring from support forces which arise from the pressure applied to the valve. U.S. Pat. No. 6,629,682 (Duelli) proposes in this context a vacuum valve having a sealing medium which is composed of a sealing ring and an adjacent support ring, so that the sealing ring is essentially freed from support forces.

In order to achieve the required gas tightness, if appropriate both for excess pressure and for reduced pressure, some known pendulum valves or slide gate valves provide, in addition to or alternatively to the second movement step, a valve ring which is displaceable perpendicularly to the valve plate, surrounds the opening and is pressed onto the valve plate for the gastight closing of the valve. Such valves having valve rings actively displaceable relative to the valve plate are disclosed, for example, in DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve housing having an opening and a valve plate pivotable parallel over the opening and intended for controlling the flow through the opening. A valve ring which encloses the opening can be actively moved perpendicularly in the direction towards the valve plate by means of a plurality of springs and compressed air cylinders. A possible further development of this pendulum valve is proposed in US 2005/0067603 A1 (Lucas et al.).

U.S. Pat. No. 6,561,483 (Nakagawa) and U.S. Pat. No. 6,561,484 (Nakagawa et al.) disclose vacuum valves in different embodiments which comprise a valve plate divided into two. A first plate section has an opening. A second plate section is connected by means of an extendable body to the first plate section. An actuator is arranged between the first and the second plate section so that the two plate sections can be moved actively toward one another and away from one another. The extendable body is in the form of bellows. The first plate section can be pressed against the valve seat by means of the actuator, the second plate section—particularly in the case of excess pressure on the valve seat side—optionally being supported on an opposite side of the valve housing. The design of the vacuum valves described is relatively complex especially owing to the necessity of using a bellows or a plurality of large sealing rings for sealing the first plate section from the second plate section and from the valve seat and is disadvantageous to maintain and susceptible to soiling.

For the gastight sealing of the known valves having a valve ring, at least two sealing rings in the outer region of the valve plate, in particular O-rings or an additional bellows are required. In the case of a valve having a valve ring, in particular an axially sealing ring which is arranged between the valve plate and the valve ring or the opposite valve seat, and a radially sealing ring—in particular externally sealing ring arranged between the valve ring and a edge section of the opening of the valve housing—which ensures a gastight seal between the valve ring and the valve housing along its region of movement are required. Since sealing rings in the outer region of the valve plate and having a relatively large diameter are susceptible and sensitive wearing parts, the use of a plurality of large sealing rings is disadvantageous.

A further disadvantage of such valves having an actively adjustable valve ring is the relatively complicated and bulky design of the valve, the necessity of a complex control of the contact pressure and the presence of a plurality of moving parts in the flow channel, which complicate maintenance and cleaning of the valves.

Especially because of the field of use of pendulum and slide gate valves between process chambers and vacuum pumps in long production plants, as flat a design as possible of the valve with respect to the distance from opening to opening is required, for example, in order to keep the transport paths of the parts or gasses and the total internal gas volume as small as possible and to arrange the individual components of the production plant as close together as possible and thus to permit a compact design of the production plants. In particular valves with an actively adjustable valve ring or valve plate sections meet this requirement only to an insufficient extent for numerous applications.

OBJECT OF THE INVENTION

It is therefore an object of the invention to solve the problems described above and to provide a valve of the type mentioned at the outset which has a simple and compact design, is easy to maintain and is capable of withstanding high pressure loads—optionally active on both sides.

SUMMARY OF THE INVENTION

This object is achieved by realizing the characterizing features disclosed herein. Features which further develop the invention in an alternative or advantageous manner are further described herein.

The valve according to the invention for essentially gastight closing of a flow path has a valve housing having a first wall which has a first opening for the flow path and a first valve seat surrounding the first opening. The first opening has, for example, a circular cross-section or a rectangular cross-section with rounded corners. A central axis of the first opening is defined, for example, by the longitudinal path of the opening, by the path of a connection arranged on the opening, by the connecting line with any second opening or by the area of the valve seat. In generally functional terms, a valve seat is to be understood as meaning a section which acts as a sealing area or support area in the wall, on which a further area acting as a sealing area or support area can rest. The valve housing may also be formed by the wall alone. The flow path is the regular, blockable flow path of a gaseous or liquid medium through the opening and the valve.

Furthermore, the valve comprises a valve plate by means of which the first opening can be closed and opened again. The term valve plate is to be understood equivalent to the term valve disk. The valve plate has at least one closing side on which a first sealing ring corresponding to the first valve seat and capable of making gastight contact with it is arranged. The first sealing ring is fixed to an edge region of the closing side, in particular by closure by adhesive force, like means of vulcanization or by any other suitable adhesive-bound joint, by form closure, e.g. by a recess, or by force closure. The first sealing ring has, for example, the shape of an O-ring having a circular cross-section, or the shape of any other suitable sealing ring having any kind of cross-section, e.g. oval, square, polygonal, club-shaped or horseshoe-shaped. The closing plate has, for example, a round or rectangular cross-section. The dimension of the closing side permits closing of the first opening by overlapping and placing on the first opening.

The valve has at least one drive by means of which the valve plate can be swivelled or moved essentially parallel to the first valve seat over the cross-section of the first opening and can thus be brought from an opened position in which the flow path is unobstructed to an intermediate position—and vice versa. In this intermediate position, the closing side of the valve plate is in a position opposite to the first valve seat, a distance away or making gentle contact. If the valve is a pendulum valve, the drive is formed in such a way that the valve plate is rotationally pivotable essentially parallel over the cross-section of the first opening about an adjustment axis which is in particular parallel to the opening axis, while the drive in the case of a slide gate valve moves the valve plate translationally essentially parallel in the form of a linear displacement over the cross-section of the first opening. Other, in particular combined movement variants for positioning the valve plate in the intermediate position are known from the prior art and are likewise possible.

By means of the drive or by means of an additional drive, the perpendicular distance between the valve plate and the first valve seat, starting from the intermediate position, can be reduced so that, in a closed position, the flow path is closed essentially gastight by an axially sealing contact between the first sealing ring and the first valve seat. This is effected in particular by a perpendicular movement of the valve plate with its closing side on to the valve seat. In order to avoid shear forces when the first sealing ring is pressed onto the valve seat, this movement should be effected as far as possible linearly and perpendicularly to the valve seat. Pressing on by means of a pivot movement is also possible, the pivot axis being a distance away from the opening so that a quasi-linear movement on the valve plate takes place during pressing on. Alternatively or additionally, it is possible to reduce the distance between the valve plate and the first valve seat by moving the valve seat in the direction toward the closing side of the valve plate. In this embodiment, a movement of the valve plate perpendicularly to the valve seat can be omitted. Different drive variants for achieving the at least two stage movement described are known from the prior art and are not explained further. It is also possible to combine the two movements by fading from the parallel movement to the perpendicular movement, and/or vice versa. In this case, the intermediate position is reached when the parallel movement of the valve plate stops or is so small that shear forces are avoided when the first sealing ring is pressed onto the valve seat.

The kinematic connection of the valve plate to the drive is effected, for example, by means of an arm or connecting rod.

When radial and axial direction and sealing effects are discussed in relation to the valve plate in the context of the invention, this relates not only to a circular cross-section of the opening or of the valve plate including its sections but also to other, for example rectangular, cross-sections. In the latter case, radial is to be understood as meaning a direction from the inside to the outside and, conversely, parallel to the front surface, plane of the plate or disk or plane of the valve seat, and axial is to be understood as meaning a direction perpendicular thereto.

According to the invention, the valve plate is divided into at least two sections, namely a support part and a sealing part.

The support part is coupled to the drive and fixes the first sealing ring in the perpendicular direction to the first valve seat so that the first sealing ring is present in an axially sealing manner perpendicularly between the two parts when the valve plate is pressed onto the valve seat, or vice versa, and remains coordinated with the valve plate on releasing the connection. In the closed position of the valve, the support part has, in particular, a front area which is essentially parallel to the first valve seat.

The sealing part is movably mounted on the support part, so as to be movable relative to the support part in a direction essentially perpendicularly to the first valve seat and essentially parallel to the opening axis, and is thus decoupled from the support part within a certain range of movement in the direction of the opening axis. The sealing part is connected in an essentially gastight way to the support part in a central region, in particular near to the central axis of the valve opening.

The sealing part has an inward-facing inner circumferential area in an outer region of the valve plate. The inner circumferential area encloses the first sealing ring of the support part essentially gastight with an inner seal or by a radially sealing contact. Thus, the first sealing ring performs two sealing functions. Firstly, it seals the connection between the first valve seat and the first sealing ring in the axial direction in the closed position of the valve. Secondly, it seals the connection between the first sealing ring and the sealing part in the radial direction. This has considerable advantages with respect to the complexity of the design and the maintainability of the valve since a single sealing ring performs the function of two sealing rings.

The support part and the sealing part together form an essentially gastight valve plate, wherein gas-tightness is achieved, in particular, by, firstly, the gastight connection between the first sealing ring an the sealing part, secondly, the gas-tightness of the sealing part in the section between the first sealing ring and the gastight connection to the support part in the central region, thirdly, the gastight way of connection between the sealing part and the central region of the support part, e.g. by a second sealing ring or at least one bellow, and, fourthly, the gas-tightness the support part in its central region.

In an embodiment of the invention, support part has, on the closing side, in an edge region being enclosed the inner circumferential area, a recess which runs around the outside, holds the first sealing ring and has an undercut fixing the first sealing ring in the perpendicular direction to the first valve seat. The undercut ensures fixing of the first sealing ring on the support part perpendicular to the valve seat by form closure. It is possible additionally to create a strong connection between the first sealing ring and the support part by adhesive force, for example by means of vulcanization. In another embodiment of the invention, the first sealing ring is fixed to the edge region of the closing side of the support part by adhesive force only, e.g. by means of vulcanization. Additionally or alternatively, it is possible to fix the first sealing ring by force closure.

The support part has, in particular, the functions of supporting the first sealing ring, pressing the first sealing ring onto the first valve seat in the closed position of the valve, in particular with a constant force, and movably supporting the sealing part.

In the closed position, a pressure difference at the valve plate acts essentially on the sealing part, and the sealing part is supported perpendicularly and in a manner essentially decoupled from the support part on the valve housing. Hence, a relative reduced pressure (relative negative pressure), acts on the closing side and a relative excess pressure (relative positive pressure) acts on the opposite side of the valve plate, essentially on the sealing part, as a result of the perpendicular decoupling of the sealing part from the support. The sealing part is thus supported perpendicularly, and in a manner essentially decoupled from the support part, on a section of the valve housing, in particular the first wall, especially the first valve seat, and/or for example, by means of a support frame or a collar which engages a groove formed in the valve housing, on the groove of the valve housing.

This decoupling of the two plate sections has substantial advantages for the sealing behavior, the maximum load capacity, the design, the dimensioning and the wear of the valve. Since, owing to the pressure difference, scarcely any forces act on the support part which carries the first sealing ring, but only on the decoupled sealing part supported on the valve housing, the support part which is coupled to the drive scarcely performs a load carrying function in case a large pressure difference but mainly the function of achieving a constant pressing of the first sealing ring onto the first valve seat. Thus, both the drive of the valve plate and the first sealing ring are relieved of pressures acting on the valve plate. Contact pressure regulation of the valve plate, regulated as a function of the pressure difference prevailing at the valve, can be omitted since the contact pressure need correspond only to the sealing force required for achieving the axial seal.

In a further development of the invention, the valve plate comprises resilient means, in particular at least one spring, which are arranged in such a way and act between the support part and the sealing part in such a way that the sealing part is pressed within its range of movement in the starting position in the direction of the first valve seat and the closing side and, in the closed position with relative pressure equality at the valve, rests directly or indirectly on the valve housing, in particular on the first valve seat or a lateral surface of the groove. If there is a change from the state of pressure equality to reduced pressure or excess pressure on the closing side, the sealing part already resting on the valve housing remains unmoved and an excessive mechanical load is avoided.

In a further, advantageous embodiment, the valve housing additionally has, in an essentially parallel opposite position a distance away relative to the first wall and the first opening, a second wall having a second opening for the flow path and a second valve seat surrounding the second opening. The valve plate is pivotable or displaceable between the first opening and the second opening, and in the intermediate position and in the closed position, the valve plate is pivoted or displaced between the first opening and the second opening. The driving of the valve plate and the opening and closing of the first opening are effected as described above. In the closed position of the valve, the second opening is present on that side of the valve plate which is opposite the closing side. In this embodiment, the sealing part is formed in such a way that, in the closed position with a relative excess pressure on the closing side of the valve plate, the sealing part is supported perpendicularly, essentially decoupled from the support part, on the second valve seat. For this purpose or in general, the sealing part has, for example, an outer annular section and an inner plate-like section. The outer annular section at least partially encloses the support part, the first sealing ring and the inner plate-like section. The outer annular section, in particular being hollow-cylindrical, extends parallel, in particular coaxially, to the central axis of the first opening, especially perpendicularly between the first valve seat and the second valve seat. By means of outer annular section, support on the second valve seat occurs in the case of relative excess pressure. Consequently, in the closed position, the possible relative range of movement of the sealing part is limited on one side of the valve plate by support of the front area of the annular section on the first valve seat and on the other side of the valve plate by support of the back area of the annular section on the second valve seat. As a result of this, the valve has a high load capacity on both sides. A transition from reduced pressure to excess pressure and vice versa results in a change of the support areas of the sealing part without the contact pressure of the support part with its first sealing ring on the first valve seat being influenced thereby. Thus, the valve according to the invention has a high load capacity on both sides without considerable loading of the drive or of a sealing area.

The inner plate-like section extends, in particular, radially and in an essentially gastight way, in particular without having any through holes permeable to gas and/or fluids, between the outer annular section and the central region of the support part, and is connected in an essentially gastight way to the support part in the central region.

The sealing part is connected in an essentially gastight way to the support part in the central region by means of at least one second sealing ring and/or at least one bellows. Any other kind of gastight and, in particular, flexible connection allowing the movement between the support part and the sealing part is possible.

In another further embodiment, the support part has, on the side opposite to the closing side in the central region located close to the central axis of the first opening in the closed position, a shaft, in particular a cylindrical shaft, connecting the support part to an arm, which is connected to the drive. The second sealing ring encloses the shaft in an essentially gastight way by a radially sealing contact.

A similar effect of supporting the sealing part can also be achieved by an inner lateral groove in the valve housing, which groove is formed and arranged in such a way that at least a partial section of the sealing part, in particular at least one outer lateral collar, arranged on the sealing part, projects into the lateral groove in the closed position and, in particular, in the intermediate position, and in case of the pressure difference at the valve plate, the sealing part is supported on the valve housing, on a lateral area—in particular alternately both opposite lateral areas—of the lateral groove. Further developments for supporting the sealing part on the valve housing are of course possible.

BRIEF DESCRIPTION OF THE DRAWINGS

The valve according to the invention is described in more detail below purely by way of example with reference to specific working examples shown schematically in the drawings, further advantages of the invention also being discussed. In some cases, reference numerals of figures already described above are used in the description of the individual figures, and individual diagrams are explained in relation to one another. Specifically.

DESCRIPTION OF THE PREFERRED EMBODIMENTS

Figure 1:
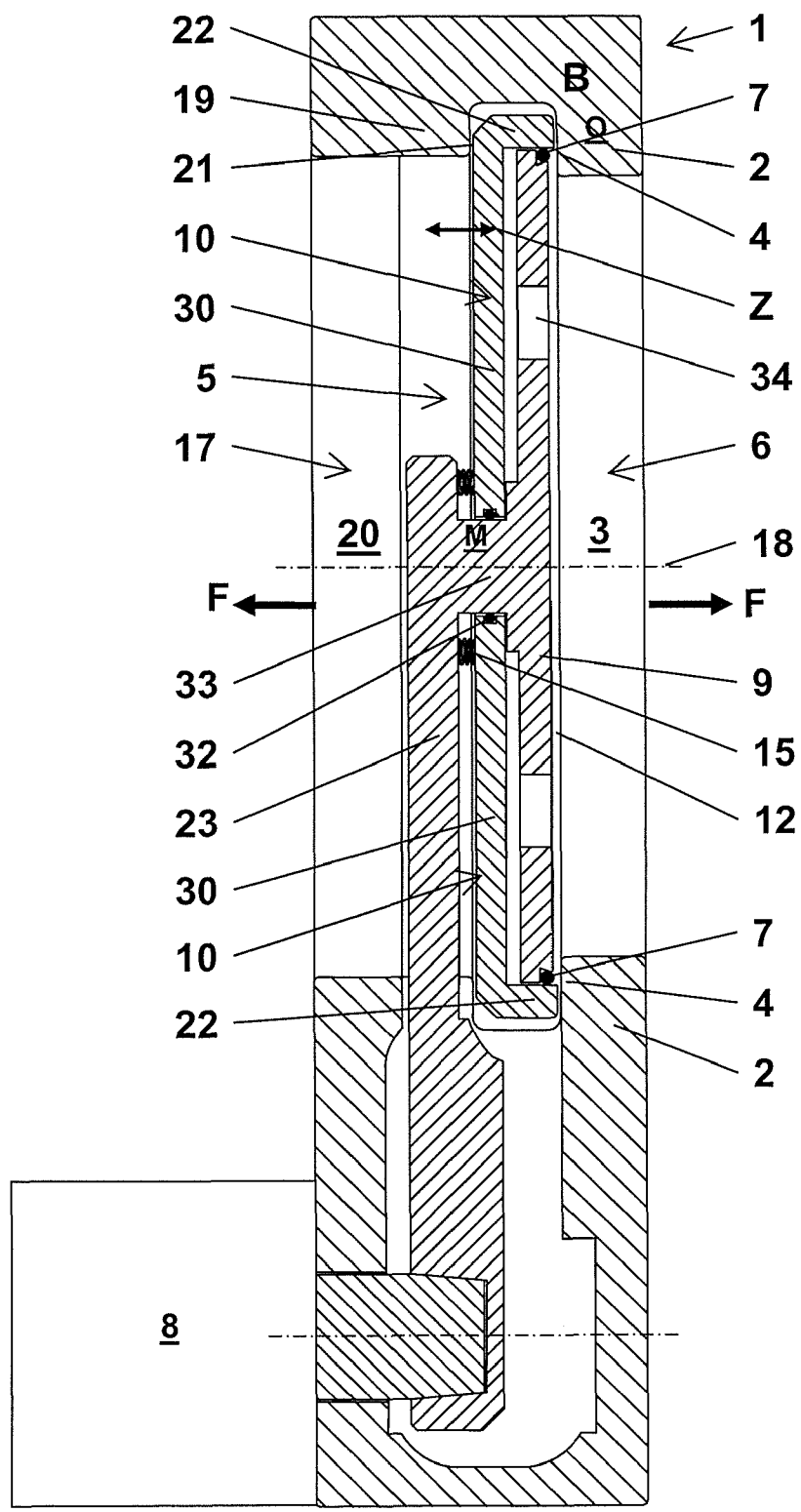
FIG. 1 shows a valve according to the invention with a second sealing ring in the intermediate position in a cross-section.
Figure 4:
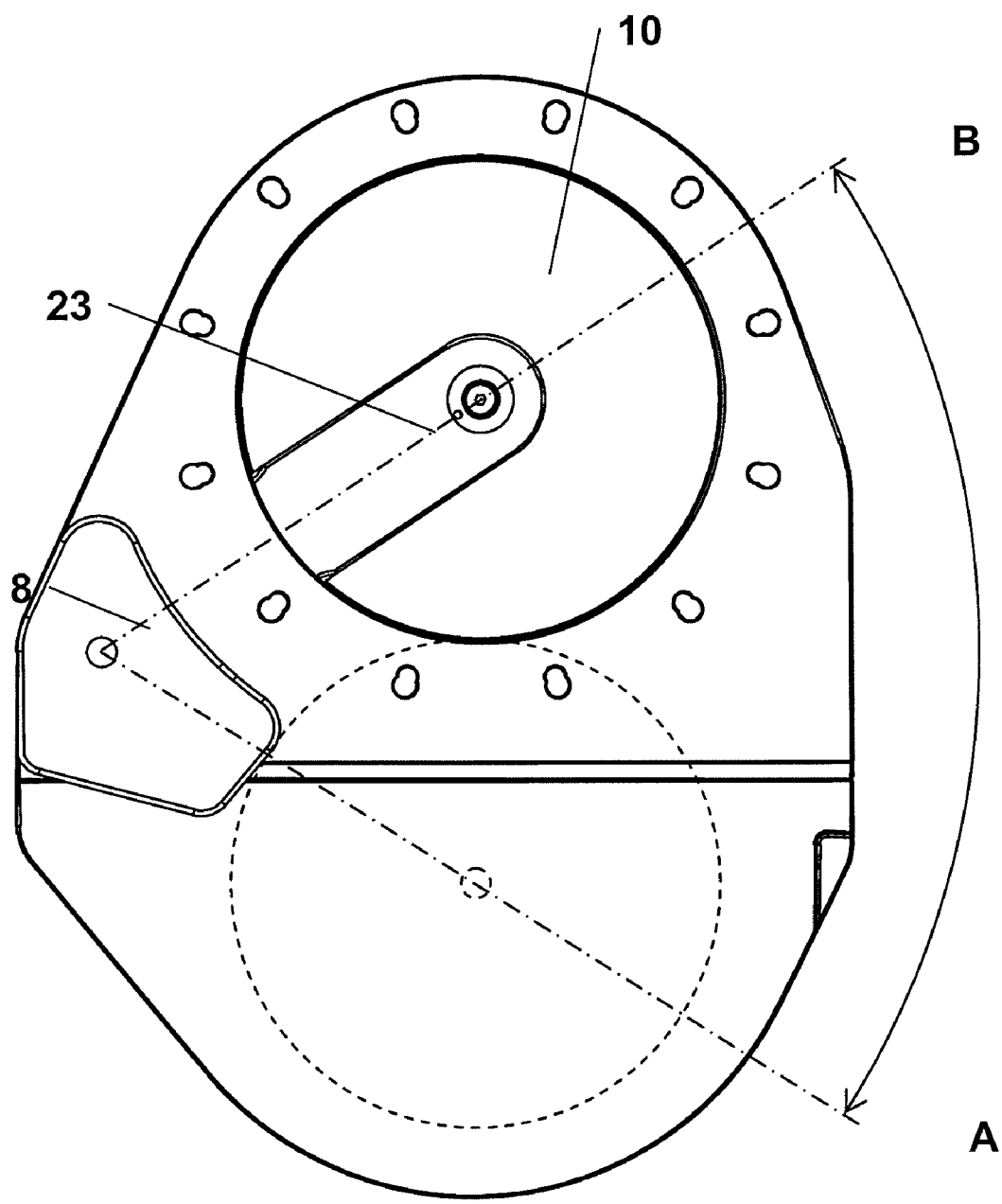
FIG. 4 shows the valve according to the invention in the intermediate position and opened position in a plan view.

FIG. 1 shows a possible embodiment of the valve according to the invention in the form of a pendulum valve. In a valve housing 1 having two walls opposite one another a distance apart, a first wall 2 and a second wall 19, two openings likewise opposite one another and having a round cross-section, a first opening 3 and a second opening 20, are formed, which openings form a flow path F leading through the valve for a gas or fluid. The two openings 3 and 20 have a common opening axis, the central axis 18 of the first opening 3. A first valve seat 4 which surrounds the first opening 3 and is formed by a flat, defined area of the first wall 2 and through whose plane the central axis 18 passes perpendicularly is formed on the inner areas of the first wall 2. Also present on the inner area of the second wall 19, parallel to the first valve seat 4, is a second valve seat 21. A drive 8 which is connected by means of an arm 23 to a valve plate 5 is arranged on the valve housing 1. The valve plate 5 is pivotable by means of the drive 8 between an opened position A as shown by a dashed line in FIG. 4, and an intermediate position B, cf. likewise FIG. 4 and FIGS. 1 and 2, parallel to the walls 2 and 19 and the valve seats 4 and 21. In the opened position A the valve plate 5, whose cross-section can cover the first opening 3, opens the flow path F and the valve is completely, or in other embodiments partially, opened. In the intermediate position B, as shown in FIG. 1, the valve plate 5 covers the first opening 3 and is therefore between the first opening 3 and the second opening 20, the valve plate 5 being present with its closing side 6 opposite the first valve seat 4 and a distance away therefrom.

Figure 5A:
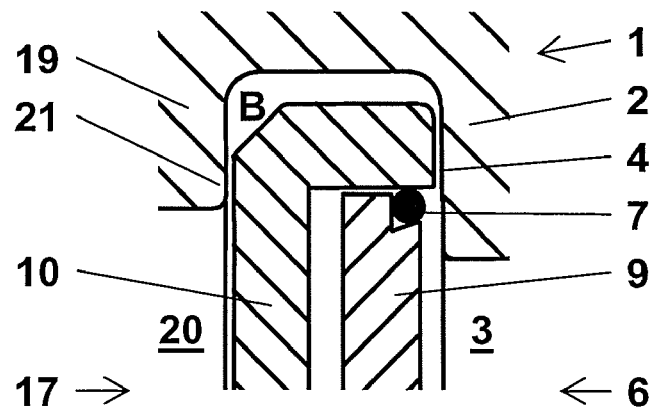
FIG. 5*a* shows the valve according to the invention in the intermediate position in a detailed view.

The valve plate 5 is divided into two sections, namely a support part 9 and a sealing part 10. The support part 9 has, on the side 17 opposite to the closing side 6 in a central region located close to the central axis 18 of the first opening 3, a cylindrical shaft 33 connecting the support part 9 to the arm 23, which is connected to the drive 8. The shaft 33 adjoins to a disk-shaped section of the support part 9, having a plurality of through holes 34 so that gas can pass through said disk-shaped section of the support part 9. Although the disk-shaped section, the shaft 33 and the arm 23 are shown as one single piece, in practice, these sections can be divided into several pieces which are connected to each other. The disk-shaped section is in the form of a round disk having a front area 12 essentially parallel to the first valve seat 4 on the closing side 6 and having through holes 34. The disk-shaped section of the support part 9 has, on the closing side 6 in an edge region a recess 13, which runs around the outside and in which an all-round first sealing ring 7 in the form of an O-ring having a circular cross-section is present, as shown in FIG. 1 and FIG. 5a, a detailed view of FIG. 1. For illustrative reasons, the recess 13 is shown without the first sealing ring 7 in FIG. 2. The first sealing ring 7 is fixed on the support part 9 in a perpendicular direction to the first valve seat 4 or parallel to the central axis 18 by forming an undercut 14 holding the first sealing ring 7 in the recess 13, cf. FIG. 3. Therefore, the first sealing ring 7 is held by form closure, effected by the undercut 14. The recess 13 is bordered radially outward by an inner circumferential area 11 of the sealing part 10, so that the inner circumferential area 11 encloses the first sealing ring 7 in an essentially gastight way with an outer seal. The sealing part 10 is movably mounted on the support part 9 so as to be movable relative to the support part 9 in a direction Z essentially perpendicular to the first valve seat 4. A plurality of springs 15 between the arm 23, which is coordinated with support part 9, and the sealing part 10 result in the sealing part 10 in the starting stage being pressed in the perpendicular direction towards the first valve seat 4, as illustrated in the detailed view 5a, which shows the valve plate 5 in the intermediate position B.

Figure 2:
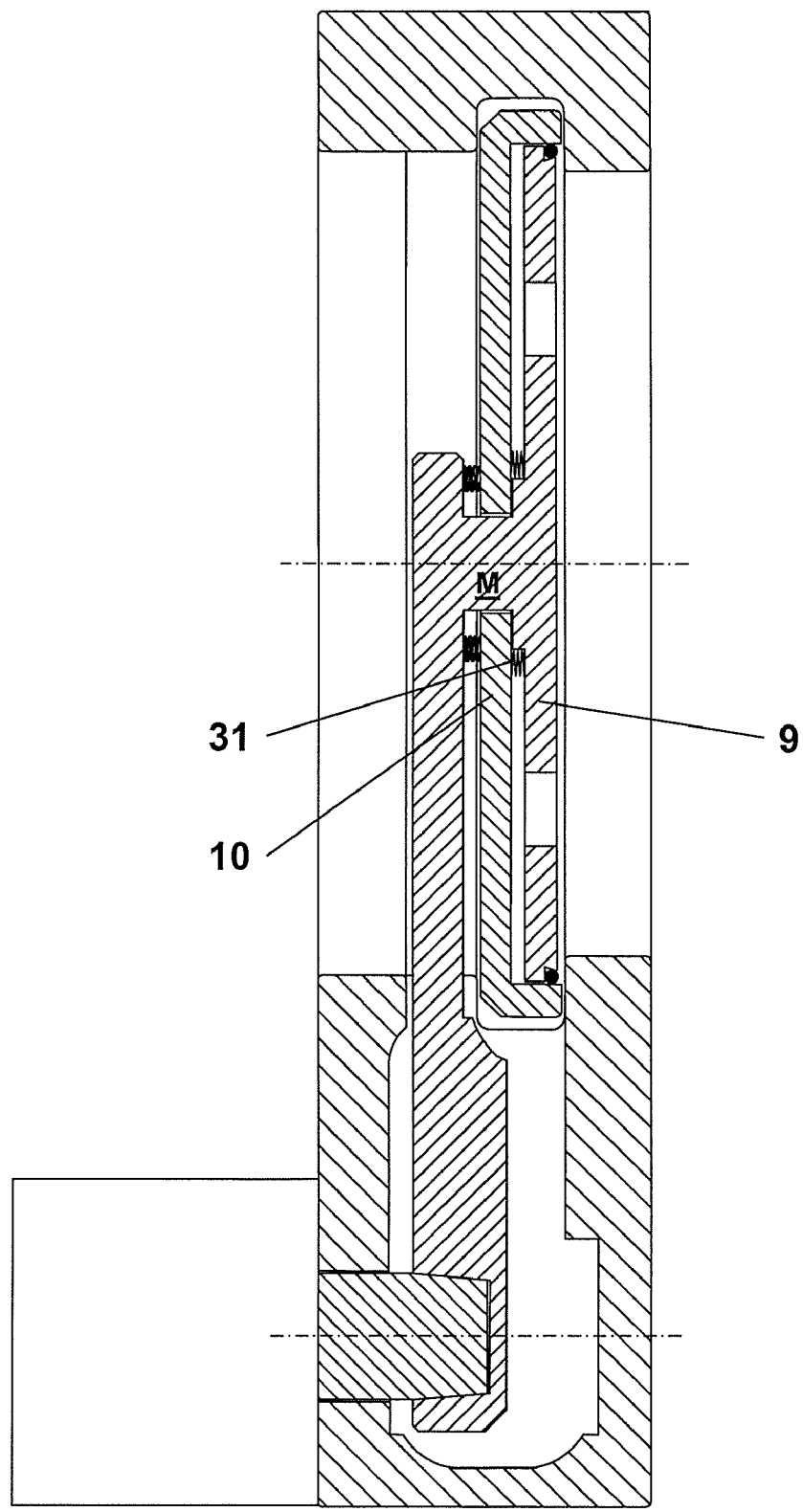
FIG. 2 shows a valve according to the invention with a bellows in the intermediate position in a cross-section.

The sealing part 10 has an outer annular section 22 and an inner plate-like section 30. The outer annular section 22 encloses the support part 9 by enclosing the first sealing ring 7 by the inner circumferential area 11 in a gastight way. The annular section 22 has a hollow-cylindrical shape and extends perpendicularly between the first valve seat 4 and the second valve seat 21. The inner plate-like section 30 extends radially and not being permeable to gasses in this area between the outer annular section 22 and the shaft 33 of the support part 9. The inner plate-like section 30 is connected in an essentially gastight way to the shaft 33 of support part 9 in the central region M by a second sealing ring 32 which is arranged in a groove and which encloses the shaft 33 in a gastight way, as shown in FIG. 1. In a further embodiment, this connection is achieves by a gastight flexible bellows 31 being arranged between the support part 9 and the sealing part 10 in the central region M, as shown in FIG. 2.

For closing the valve, the valve plate 5 is moved by means of the drive 8 from the intermediate position B in a direction toward the first valve seat 4, the perpendicular distance between the valve plate 5 and the first valve seat 4 being reduced in such a way that the first sealing ring 7 is pressed onto the first valve seat 4 so that an axially sealing contact between the first sealing ring 7 and the first valve seat 4 results. Since the sealing part 10 is sealed with respect to the shaft 33 by means of the second sealing ring 32 and with respect to the fist valve seat 4 by means of the first sealing ring 7, the flow path F is closed essentially gastight. The valve plate 5 is now in the closed position C as shown in FIGS. 5b and 5c.

Figure 5B:
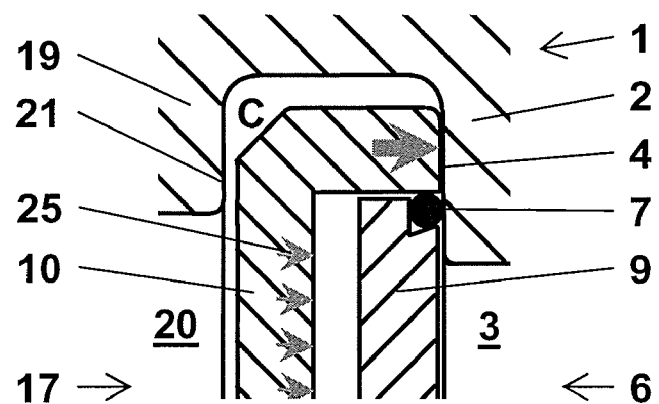
FIG. 5*b* shows the valve according to the invention in the closed position in the case of reduced pressure on the closing side in the detailed view.
Figure 5C:
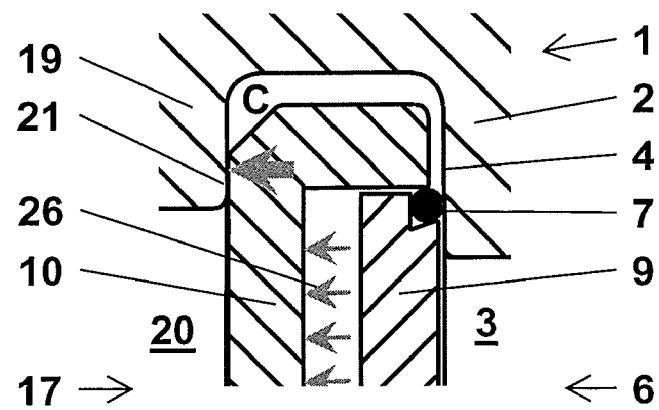
FIG. 5*c* shows the valve according to the invention in the closed position in the case of excess pressure on the closing side in the detailed view.

In the state of relative pressure equality between the first opening 3 and the second opening 20, the sealing part 10 rests on the first valve seat 4, owing to the spring force of the springs 15 (cf. FIG. 5b).

In the case of a pressure difference between the first opening 3 and the second opening 20, the pressure acts essentially on the sealing part 10, movable along the perpendicular direction Z, the support part 9 as well as the arm 23 and the drive 8 remaining free of load.

If a relative reduced pressure 25 (relative negative pressure), indicated by the arrows in FIG. 5b, prevails on the closing side 6 of the valve plate 5, the sealing part 10 is supported perpendicularly, essentially decoupled from the support part 9, on the first valve seat 4. The force due to the pressure difference acts mainly on the sealing part 10 and the first valve seat 4 having a high load capacity. Since the drive components of the valve remain free of load, the valve is capably of withstanding large pressure differences.

If there is a relative excess pressure 26 (relative positive pressure), indicated by the arrows in FIG. 5c, on the closing side 6 of the valve plate 5, the sealing part 10—decoupled from the support part 9—moves from its position resting on the first valve seat 4 in the perpendicular direction to the opposite second valve seat 21 until the outer annular section 22 of the sealing part 10 which extends perpendicularly to the second valve seat 21 and rests on the second valve seat 21 and thus supports the sealing part 10 on the second valve seat 21.

As a result of this development of the valve plate 5, which is divided into two, the valve has a high load capacity on both sides without a drive and holding system with large dimensions having to support the valve plate in the flow direction. In order to keep the perpendicular path of the sealing part 10 small in the case of a pressure reversal and a consequent change of the support area from the first valve seat 4 to the second valve seat 21, it is advantageous to keep the play between the two valve seats 4 and 21 small.

As is evident from the figures, it is not just the number of wearing parts that is kept small by the use of a sealing ring. In addition, small dimensioning of the valve and a small distance from opening to opening are possible.

Figure 6A:
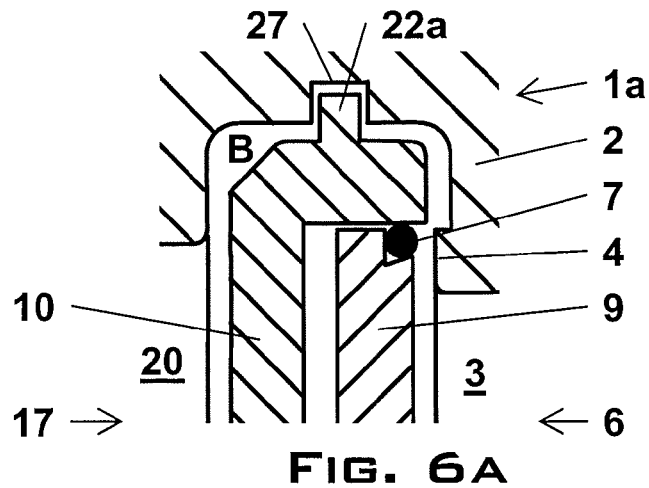
FIG. 6*a* shows an alternative embodiment of the valve according to the invention in the intermediate position in a detailed view.
Figure 6B:
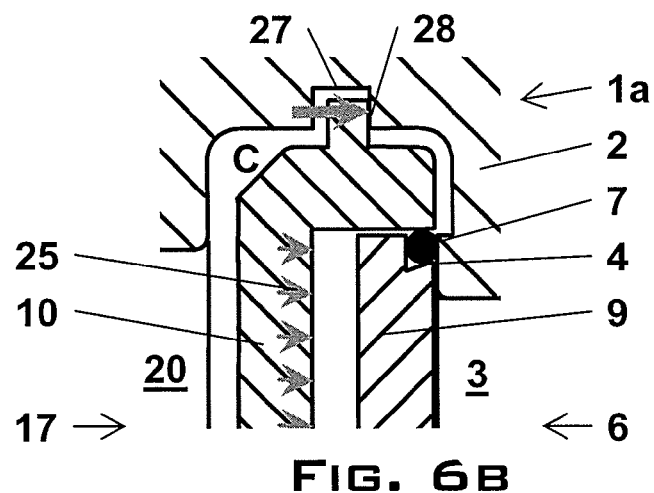
FIG. 6*b* shows the alternative embodiment in the closed position in the case of reduced pressure on the closing side in the detailed view.
Figure 6C:
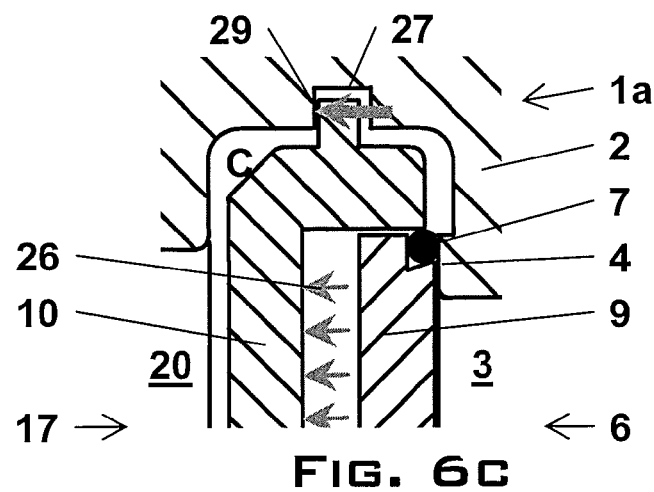
FIG. 6*c* shows the alternative embodiment in the closed position in the case of excess pressure on the closing side in the detailed view.

FIGS. 6a, 6b and 6c illustrate an alternative embodiment of a valve according to the invention. Since numerous components of this alternative embodiment are identical to those of the first embodiment described above and views which correspond to FIGS. 5a, 5b and 5c are used, the explanation of components and reference numerals already mentioned above will be dispensed with in part and reference numerals of preceding figures will be employed in some cases.

An inner lateral groove 27 which extends all around a partial section of the valve plate 5 in its intermediate position B or closed position C is formed in the valve housing 1a. This inner partial circumferential groove 27 has a rectangular cross-section with a first lateral area 28 in the direction of the closing side 6 toward the first opening 3 and a second lateral area 29 in the direction of the side 17 opposite the closing side and toward the second opening 20, cf. FIGS. 6b and 6c. The groove 27 is formed and arranged in such a way that, on pivoting or displacing the valve plate 5 from the open position A leaving the flow path F unobstructed to the intermediate position B, a lateral collar 22a arranged around the annular section 22 of the sealing part 10 is introduced into the groove 27, without contacting and a being distance away, relative to the first lateral area 28 and to the second lateral area 29, as shown in FIG. 6a, in the intermediate position B. Thus, at least a partial section of the sealing part 10, in the closed position C (cf. FIGS. 6b and 6c) in which the support part 9 is pressed on to the first valve seat 4, projects into the lateral groove 27. If, in the closed position C, there is a relative reduced pressure 25, indicated by the arrows in FIG. 6b on the closing side 6 of the valve plate 5, the sealing part 10 is supported perpendicularly, essentially decoupled from the support part 9, by means of the lateral collar 22a on the first lateral area 28 of the groove 27 of the valve housing 1a, without there being any contact between the sealing part 10 and the first valve seat 4. The force due to the pressure difference acts mainly on the sealing part 10 and the first lateral area 28 of the groove 27, which lateral area has a high load capacity. Since the drive components of the valve remain free of load, the valve is capable of withstanding large pressure differences.

If, on the other hand, there is a relative excess pressure, indicated by the arrows 26 in FIG. 6c, on the closing side 6 of the valve plate 5, the sealing part 10—decoupled from the support part 9—moves from its position determined by the resting of the lateral collar 22a on the first lateral area 28 in the perpendicular direction away from the first valve seat 4 until the lateral collar 22a, which is coordinated with the sealing part 10, rests on the second lateral area 29 of the groove 27 and thus supports the sealing part 10 on the valve housing 1a, cf. FIG. 6c.

Figure 7:
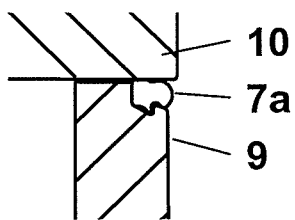
FIG. 7 shows the valve according to the invention with a first alternative first sealing ring in the detailed view.
Figure 8:
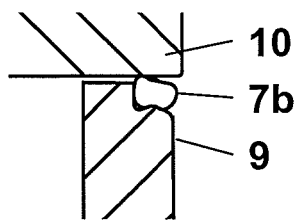
FIG. 8 shows the valve according to the invention with a second alternative first sealing ring in the detailed view.
Figure 9:
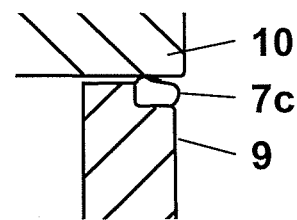
FIG. 9 shows the valve according to the invention with a third alternative first sealing ring in the detailed view.

In FIGS. 7 to 9, a first (FIG. 7), a second (FIG. 8) and a third (FIG. 9) alternative first sealing ring 7a, 7b or 7c, respectively, are illustrated schematically. FIGS. 7 to 9, show the valve in the intermediate position. Since numerous components of these alternative embodiments are identical to those of the first embodiment described above and a view which corresponds to FIG. 5a is used, reference numerals of preceding figures will be employed.

Figure 3:
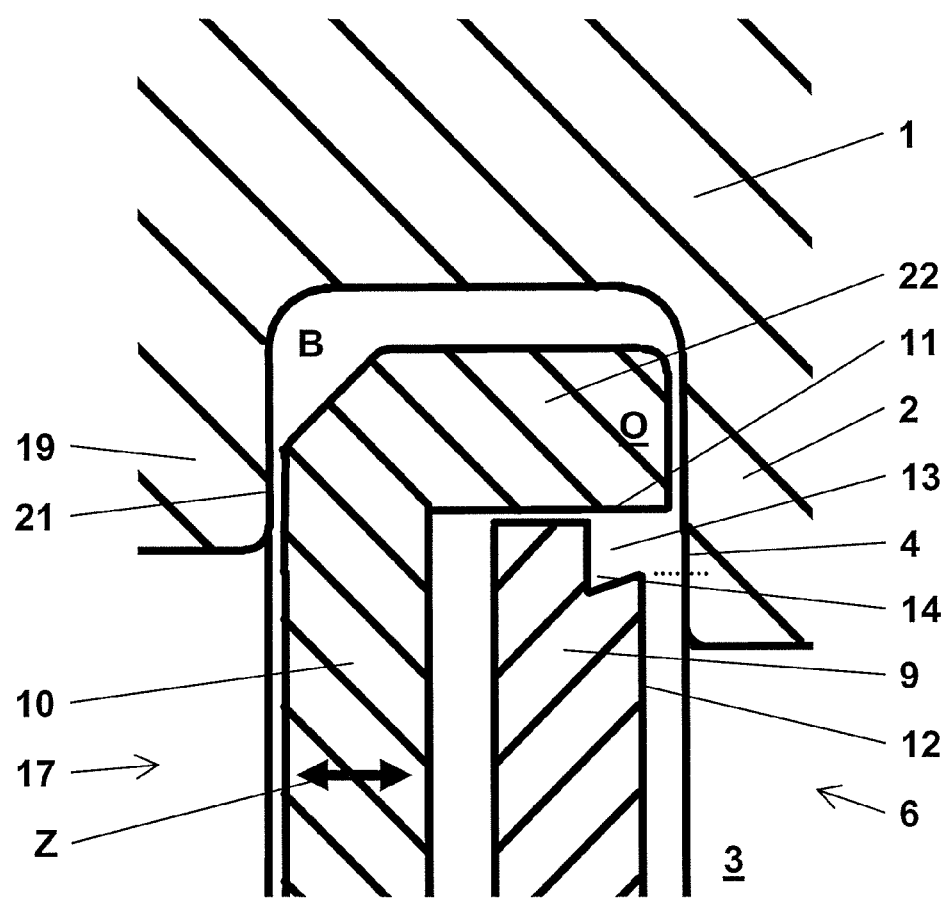
FIG. 3 shows a recess without a first sealing ring in a detailed view from FIGS. 1 and 2.

Referring to FIGS. 7 to 9, the support part 9 has, on the closing side 6, cf. FIG. 5a, in an edge region be enclosed by the sealing part 10, a recess 13, cf. FIG. 3, which runs around the outside and in which the first alternative first sealing ring 7a (FIG. 7) or the second alternative first sealing ring 7b (FIG. 8) is present. Both first and second alternative first sealing rings 7a and 7b have non-circular, freeform cross-sections. Like the first sealing ring 7 of FIGS. 1 to 6c, the first or second alternative first sealing ring 7a or 7b, respectively, is fixed on the support part 9 in a perpendicular direction to the first valve seat 4, cf. FIG. 3, or parallel to the central axis 18, cf. FIG. 1, by forming an undercut 14, cf. FIG. 3, holding the first alternative first sealing ring 7a, cf. FIG. 7, or the second alternative first sealing ring 7b, cf. FIG. 8, in the recess 13, cf. FIG. 3. In addition to said fixation by form closure, it is also possible to fix the first alternative first sealing ring 7a or the second alternative first sealing ring 7b by adhesive force, e.g. by vulcanization or by any other suitable adhesive-bound joint.

The third alternative first sealing ring 7c of FIG. 9 is fixed to the edge region of the closing side 6, cf. FIG. 3, of the support part 9 by adhesive force only, i.e. by vulcanizing the third alternative first sealing ring 7c onto the circular outward surface of the support part, being enclosed by the sealing part 10. In contrast to the support part 9 of the embodiments shown in FIGS. 1 to 8, the recess of the support part 9 of FIG. 9 does not comprise any undercut in the perpendicular direction to the first valve seat 4, cf. FIG. 3, or parallel to the central axis 18, cf. FIG. 1, so that the third alternative first sealing ring is fixed mainly by adhesive force.

Of course, it is possible for the valve described alternatively to be in the form of a slide gate valve having a rectangular or other cross-section of the valve plate and the at least one opening. It is also possible to design the valve to act on one side, the valve seat on which the first sealing ring comes to rest and that area of the valve housing which supports the sealing part being located either on the same side or on opposite sides.

The invention claimed is:

1. A valve for essentially gastight closing of a flow path, comprising
a valve housing having a first wall, which has a first opening for the flow path and a first valve seat surrounding the first opening,
a valve plate having a closing side on which a first sealing ring corresponding with the first valve seat is arranged, and
at least one drive, by means of which
the valve plate is pivotable or displaceable from an opened position in which the flow path is essentially unobstructed to an intermediate position essentially parallel to the first valve seat over the cross-section of the first opening and
the perpendicular distance between the valve plate and the first valve seat can be reduced from the intermediate position to a closed position in such a way that the flow path is closed essentially gastight by an axially sealing contact between the first sealing ring and the first valve seat,
wherein the valve plate has
a support part which
is connected to the drive,
fixes the first sealing ring in the perpendicular direction to the first valve seat,
supports the first sealing ring, and
presses the first sealing ring onto the first valve seat in the closed position of the valve, and
a sealing part,
being movably mounted on the support part so as to be movable relative to the support part and thus being decoupled from the support part within a certain range of movement in a direction essentially perpendicular to the first valve seat,
being connected in an essentially gastight way to the support part in a central region, and
having an inner circumferential area in an outer region which encloses the first sealing ring on an outer circumferential side of the support part in an essentially gastight way by a radially sealing contact,
wherein the support part and the sealing part together form the essentially gastight valve plate,
and wherein in the closed position, a pressure difference at the valve plate acts essentially on the sealing part, and the sealing part is supported perpendicularly and in a manner essentially decoupled from the support part on the valve housing.

2. The valve as claimed in claim 1, wherein the support part has, on the closing side in an edge region being enclosed by the inner circumferential area of the sealing part, a recess which runs around the outside, holds the first sealing ring and has an undercut fixing the first sealing ring in the perpendicular direction to the first valve seat.

3. The valve as claimed in claim 1, wherein the first sealing ring is fixed to an edge region of the closing side of the support part by adhesive force.

4. The valve as claimed in claim 3, wherein the first sealing ring is fixed to the edge region of the closing side of the support part by means of vulcanization.

5. The valve as claimed in claim 1, wherein the first sealing ring is in the form of an O-ring.

6. The valve as claimed in claim 1, wherein, in the case of a relative reduced pressure on the closing side of the valve plate, the sealing part is supported on the first valve seat of the valve housing.

7. The valve as claimed in claim 1, wherein the valve housing has, in an essentially parallel position opposite to the first wall and to the first opening and a distance away, a second wall having a second opening for the flow path and a second valve seat (21) surrounding the second opening,
in the intermediate position and in the closed position, the valve plate is pivoted or displaced between the first opening and the second opening (20), and the sealing part is formed in such a way that, in the closed position with a relative excess pressure on the closing side of the valve plate, the sealing part is supported perpendicularly, essentially decoupled from the support part, on the second valve seat.

8. The valve as claimed in claim 7, wherein the sealing part has an outer annular section and an inner plate-like section,
the outer annular section
at least partially enclosing the support part, the first sealing ring and the inner plate-like section, and
extending perpendicularly between the first valve seat and the second valve seat,
the inner plate-like section
extending radially and in an essentially gastight way between the outer annular section and the central region of the support part, and
being connected in an essentially gastight way to the support part in the central region
wherein by means of the outer annular section support on the second valve seat is provided in the case of the relative excess pressure on the closing side.

9. The valve as claimed in claim 8, wherein the outer annular section is hollow-cylindrical.

10. The valve as claimed in claim 1, comprising an inner lateral groove in the valve housing, which lateral groove is formed and arranged in such a way that
at least a partial section of the sealing part projects, in the intermediate position and in the closed position, into the lateral groove, and in the closed position and in case of the pressure difference at the valve plate, the sealing part is supported on the valve housing, on a lateral area of the lateral groove.

11. The valve as claimed in claim 10, wherein the partial section of the sealing part is formed as an outer lateral collar arranged on the sealing part.

12. The valve as claimed in claim 1, comprising resilient means, which are arranged in such a way—acting between the support part and the sealing part—that the sealing part in the closed position, with relative pressure equality at the valve, rests on the valve housing in direction of the closing side.

13. The valve as claimed in claim 12, wherein the resilient means are in the form of least one spring.

14. The valve as claimed in claim 1, wherein the sealing part being connected in an essentially gastight way to the support part in the central region by means of a second sealing ring.

15. The valve as claimed in claim 1, wherein the sealing part being connected in an essentially gastight way to the support part in the central region by means of a bellows.

16. The valve as claimed in claim 14, wherein
the support part has, on the side opposite to the closing side in a central region located close to the central axis of the first opening in the closed position, a shaft connecting the support part to an arm, which is connected to the drive, and
the second sealing ring enclosing the shaft in an essentially gastight way by a radially sealing contact.

17. The valve as claimed in claim 1, wherein
the valve is in the form of a pendulum valve and
the drive is formed in such a way that the valve plate is pivotable essentially parallel over the cross-section of the first opening.

18. The valve as claimed in claim 1, wherein
the valve is in the form of a slide gate valve and
the drive is formed in such a way that the valve plate is displaceable essentially parallel over the cross-section of the first opening.

* * * * *